No. 784,458.                                    Patented March 7, 1905.

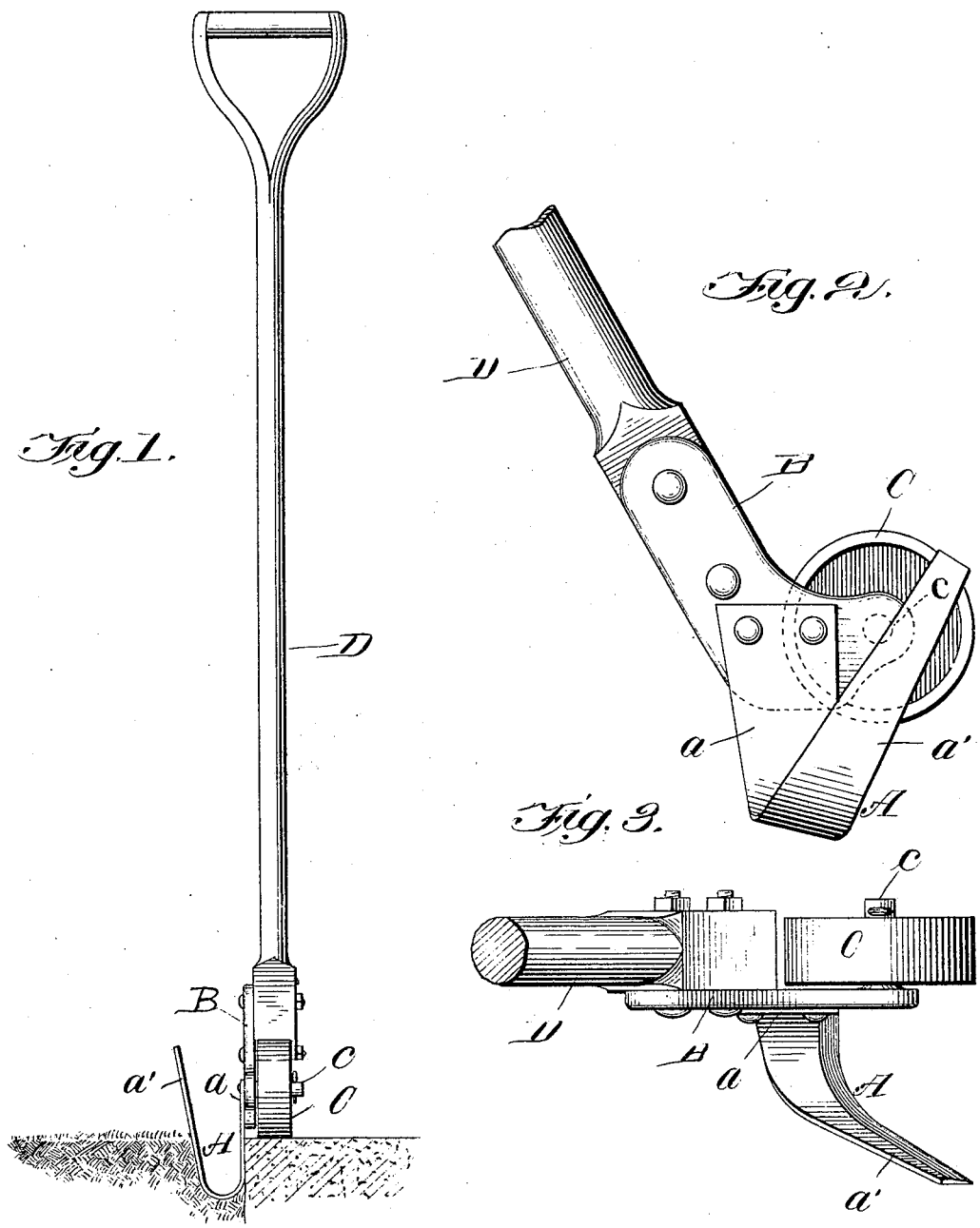

UNITED STATES PATENT OFFICE.

LEONARD C. WEMPLE, OF CHICAGO, ILLINOIS.

TRENCH-CUTTER.

SPECIFICATION forming part of Letters Patent No. 784,458, dated March 7, 1905.

Application filed December 17, 1903. Renewed January 19, 1905. Serial No. 241,784.

*To all whom it may concern:*

Be it known that I, LEONARD C. WEMPLE, a citizen of the United States, residing at Chicago, in the county of Cook and State of Illinois, have invented certain new and useful Improvements in Trench-Cutters, of which the following is a specification.

In the care of lawns a shallow channel or trench is frequently cut in the sod immediately adjacent to the edge of the cement or other walk. In cutting this channel or trench the sod and earth are removed to a depth and width of, say, from two to three inches.

The object of the present invention is to provide an improved implement with which it can be done uniformly and expeditiously.

To these ends the invention consists in the features of novelty that are hereinafter described with reference to the accompanying drawings, in which—

Figure 1 is a front elevation of an implement embodying the invention and showing it in use, adjacent portions of the walk and lawn being shown in section. Figs. 2 and 3 are respectively a side elevation and a plan view thereof.

The device comprises a cutting-blade A, a fitting B, to which it is secured, a supporting-wheel or roller C, journaled on a trunnion $c$, carried by the fitting, (preferably integral therewith,) and a handle D. Viewed edgewise the blade is of U shape substantially, excepting that its two sides $a$ and $a'$ are preferably slightly divergent. The side $a$ is secured to a fitting B and extends downward below the periphery of the wheel C a distance equal to the depth of the trench to be cut, and said side $a$ occupies a plane which is parallel with the general plane of said wheel, so that it will travel quite close to or in contact with the side of a cement or other walk. In other words, it will occupy a vertical position while the implement is in use. The other side, $a'$, diverges from the aforesaid plane and extends upward a considerable distance above the surface of the walk for the purpose of insuring the cutting of the sod even where the lawn adjacent to the walk slopes at a considerable angle. The cutting edge of the blade is deflected forward from the vertical, so that it will have a shearing action.

This simple implement propelled through the medium of the handle as the user walks along will make a cut corresponding in shape with the shape of the blade, leaving the earth and sod in place. By following this cut with a trowel or scoop the earth and sod within the boundaries of the cut can be easily and quickly removed.

It will be observed that the wheel of the present device is purely and simply a supporting-wheel and does not have the function of a colter-wheel. It is intended to travel along the edge of the walk and simply support the cutting-blade, so that the latter, which extends downward below the periphery of the wheel, will make a cut of uniform depth and width. It will be observed also that the implement has nothing in the nature of a moldboard for following the cutter and removing the sod and earth as fast as the cut is made. One objection to a moldboard is that it greatly adds to the power required for propelling the implement and puts its use beyond the strength of many people who would otherwise be able to use it. In addition to omitting the moldboard I leave the space bounded by the cutting-blade wholly open and unobstructed from front to rear, so that the resistance to the propulsion of the implement is reduced to a minimum. The use of a supporting-wheel adapted to run on the cement or other sidewalk still further reduces the resistance and in addition to this accurately determines the depth of the cut.

What I claim as new, and desire to secure by Letters Patent, is—

1. An implement of the class described, having a supporting device, a cutting-blade of U shape, substantially, located at one side of the supporting device and extending downward, below it, whereby said supporting device limits the depth of the cut, the space bounded by the blade being wholly open and unobstructed from front to rear, and propelling means, substantially as described.

2. An implement of the class described having a handle for propelling it, a supporting-wheel adapted to run upon the sidewalk, and a blade of substantially U shape, located at one side of the supporting-wheel and extending downward below the periphery thereof, the space bounded by the blade being wholly open and unobstructed from front to rear, substantially as described.

LEONARD C. WEMPLE.

Witnesses:
G. B. DOUGLAS,
L. M. HOPKINS.